July 8, 1941.    J. F. JAWOROWSKI    2,248,354
PRESSURE REGULATING VALVE
Filed April 1, 1939    2 Sheets-Sheet 1

INVENTOR.
JOSEPH F. JAWOROWSKI
BY
ATTORNEY.

July 8, 1941.　　　J. F. JAWOROWSKI　　　2,248,354
PRESSURE REGULATING VALVE
Filed April 1, 1939　　　2 Sheets-Sheet 2
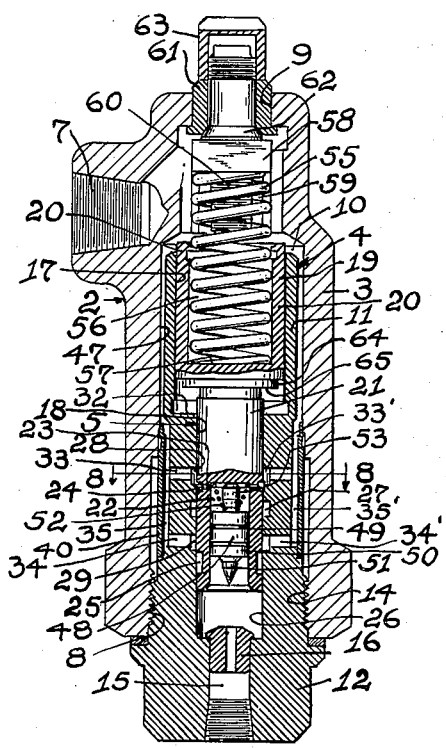
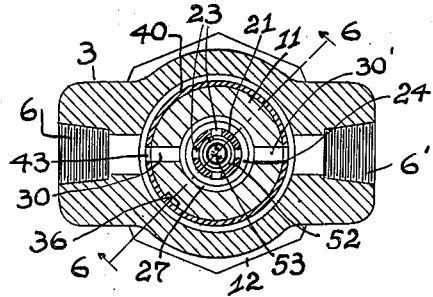
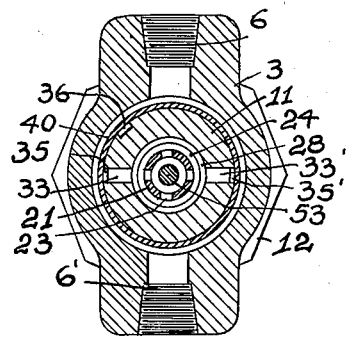
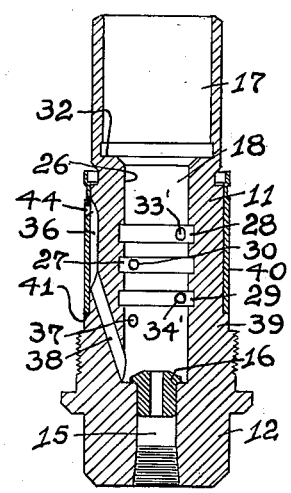
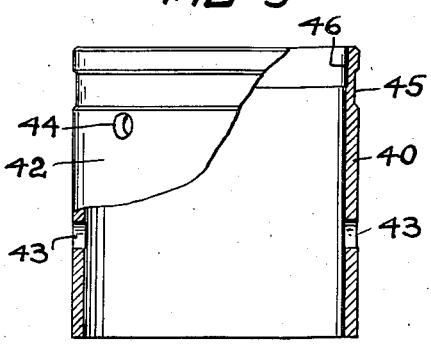
INVENTOR.
JOSEPH F. JAWOROWSKI
BY Gustav A. Wolff
ATTORNEY.

Patented July 8, 1941

2,248,354

UNITED STATES PATENT OFFICE 2,248,354

PRESSURE REGULATING VALVE

Joseph F. Jaworowski, Allegan, Mich., assignor of one-half to Sam W. Emerson, Cleveland, Ohio Application April 1, 1939, Serial No. 265,496

4 Claims. (Cl. 137—153)

This invention relates in general to valves and more particularly to pressure regulating valves adapted to be used for controlling the flow of liquid in fluid passages, pipes, etc. and prohibiting such flow below predetermined pressures. A valve of this type should effect instantaneous full opening and/or closing of the line, otherwise the liquid pressure will be subjected to substantial changes due to the changing cross section of the valve controlled outlet of the valve during opening and/or of closing operations. In my co-pending application Ser. No. 142,542, filed May 14, 1937, and now Patent No. 2,191,319, granted Feb. 20, 1940, I have disclosed a pressure operated valve adapted to effect such instantaneous opening and/or closing of a fluid line by snap-like actuated shiftable valve portions arranged in the valve.

The general object of my present invention is to provide a simplified pressure operated valve embodying stationary, passaged supporting and guiding means and pressure actuated shiftable valve portions within said supporting and guiding means, including an axially shiftable valve member controlling the outlet of the pressure operated valve and effecting instantaneous snap-like opening and/or closing of said outlet at predetermined pressures.

Another object of my invention is the provision of a pressure regulating valve of the type referred to above of simple and sturdy construction which can readily and easily be manufactured at relatively low cost and stands up under excessive use and abuse.

With these and incidental objects in view, the invention consists in certain novel features of construction and combination of parts, the essential elements of which are set forth in the appended claims; and a preferred form of embodiment of the invention is hereinafter shown with reference to the drawings accompanying and forming a part of this specification.

In the drawings:

Fig. 5 is another sectional view through the valve unit shown in Fig. 1, the section being taken on line 5—5 of Fig. 1.

Fig. 6 is a sectional view through the assembled chambered valve body and sleeve prior to their mounting into the valve housing, the section being taken on a line 6—6 of Fig. 7 to show the inlet passage through the sleeve into the chambered valve body.

Fig. 7 is a cross sectional view on line 7—7 of Fig. 3.

Fig. 8 is a cross sectional view on line 8—8 of Fig. 5.

Fig. 9 is a sectional view partly in elevation of the sleeve enclosing and tightly sleeved upon the chambered valve body.

Figure 1:
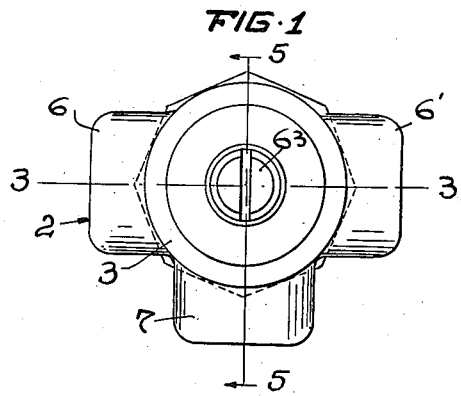
Fig. 1 is a plan view of a pressure actuated valve unit embodying the invention.
Figure 2:
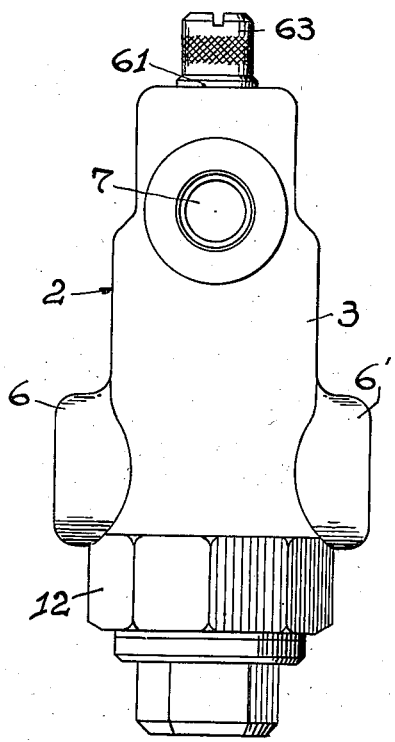
Fig. 2 is a side view of the valve unit shown in Fig. 1.
Figure 3:
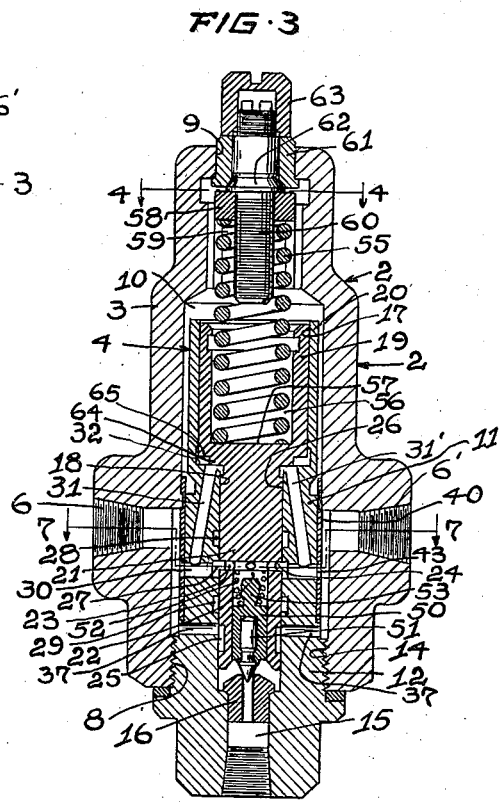
Fig. 3 is a transversal sectional view through the valve unit shown in Fig. 1, the section being taken on line 3—3 of Fig. 1.
Figure 4:
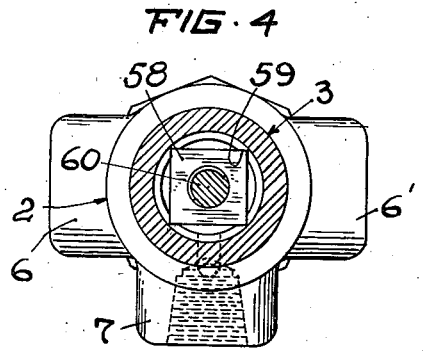
Fig. 4 is a cross sectional view on line 4—4 of Fig. 3.

Referring more particularly to the drawings which illustrate a practical embodiment of my invention, there is shown a pressure regulating valve 2 embodying a housing 3, a pressure responsive portion 4, and a valve body and valve mechanism 5. Housing 3, a metal casting, is provided with two inlets 6, 6' and a bypass outlet 7 adapted to be readily connected with the suction or return line of a fluid feeding or circulating system, not shown. A threaded bottom opening 8 in housing 3 permits of the valve body and valve mechanism 5 to be readily inserted into and connected with housing 3, and a round opening 9 in the top of housing 3 permits of the pressure responsive portion 4 being extended outwardly through said top, all as will hereinafter more fully be described.

The valve body and valve mechanism 5 which, as stated above, is extended through opening 8 into the cylindrical chamber 10 of housing 3 consists of a substantially cylindrical chambered body or cage 11, the nut-shaped perforated end portion 12 of which is threadedly connected with the threaded wall 14 of the bottom opening 8. Body 11, which mounts in the central bore 15 of its end portion 12 a valve seat 16, is formed with axially aligned communicating cylindrical chambers 17 and 18, chamber 17, the smaller one in cross section, being arranged adjacent to bore 15, and chamber 18, the larger one in cross section, being arranged adjacent to chamber 17 and fully open at its free end. Chambers 17 and 18 form axially aligned cylinders for a compound piston 19 forming part of pressure responsive portion 4. This cylinder embodies a portion 20 of large cross section snugly fitting chamber 18 and a portion 21 of smaller cross section snugly fitting chamber 17. Portion 21 of piston 19 has its end portion axially bored to form a cylindrical chamber 22, which chamber extends over about half the length of portion 21 and has its wall perforated on radial bores 23 near the inner end of said chamber 22. In addition, there are provided circumferential grooves 24 and 25 in the peripheral surface of portion 21 arranged in specific relation to each other and the said portion 21, groove 24 being aligned with bores 23 which are extended thereinto, and groove 25 being positioned for co-operation with other grooves and bores, as will be presently described.

Chamber 18 has its peripheral surface 26 provided with three circumferential grooves 27, 28, 29 dimensioned and positioned for co-operation with the above referred to grooves 24 and 25 and bores 23 in piston portion 21. Groove 27 is arranged between grooves 28 and 29 and has radially extended therefrom two bores 30, 30', which bores extend fully through the wall of body or cage 11 and are in open communication with chamber 18 through bores 31, 31' in body 11, which bores intersect bores 30, 30' and terminate in ring-shaped end wall 32 of said chamber 18; and grooves 28 and 29 each have radially extended therefrom two radial bores 33, 33' and 34, 34' arranged on the same diameter and extended fully through the wall of body 11. All the bores 33, 33' and 34, 34' are arranged in one plane axially extended through body 11 and intersect with longitudinal grooves 35, 35' arranged in the periphery of body 11 and parallel to its axis. In addition, there are provided in body 11 another groove 36 and two radial bores 37, the groove 36 being arranged in the periphery of body 11 parallel to its axis and communicating through a bore 38 with the bottom or inner end of chamber 17, adjacent to valve seat 16, and the bores 37 being arranged below the groove 29 in a slightly enlarged portion 39 of body 11. The thus formed body 11 of the valve structure has sleeved thereupon a sleeve or cover member 40 which rests upon a circumferential shoulder 41 formed on body 11 by increasing its cross section to enlarged portion 39. This sleeve, preferably a thin steel sleeve (see Fig. 9), has radially arranged in its peripheral wall 42 openings 43, aligned with bores 30, 30' in body 11, and a third opening 44 arranged in alignment with groove 36 of said body, and has furthermore its upper portion outwardly and circumferentially grooved as at 45 and its upper end countersunk as at 46 to effect tight sealing of said end with the inner wall 47 of housing 3, when the assembled valve body and valve mechanism is extended into said housing and threadedly connected therewith as previously described.

Piston 19 slidably mounts in its chamber 22 a spring pressed piston-like valve member 48, which member snugly fits said chamber and is sealed against its walls by oil grooves 49. This valve member, which embodies a cylindrical body 50 carrying a valve 51 rigidly secured thereto, is yieldingly forced into sealing engagement with the valve seat 16 by means of a helical spring 52, seated between the end wall of chamber 22 and a finger-like extension 53 on body 50. Escape of liquid through perforation 15 in end portion 12 of body 11 is thus impossible when piston 19 is forced downwardly into engagement with the ring-shaped end wall 32 of chamber 18 by means of a spring 55 partly arranged within the perforation 56 of the upper end 20 of piston 19 and seated against the bottom face 57 of said perforation and a vertically shiftable adjusting nut member 58. This nut member co-operates with grooves 59 in the wall of the housing 3 and will be vertically shifted on a threaded stem 60 when said stem is rotated in one or the other direction.

The stem 60 extends upwardly through the central opening 9 in the housing 3, and a flanged bearing 61 in said opening engaging with a collar 62 on said stem 60 permits of the stem 60 being freely rotated until the desired tension of spring 55 is effected. The exposed threaded end of stem 60 carries a lock cap member 63 to permit of the stem being rigidly clamped to the housing in any adjusted position of nut member 58.

In assembling the valve structure, stem 60, bearing 61 and cap 63 are assembled and after nut member 58 has been threaded upon stem 60 and spring 55 has been placed upon said stem, this assembly is placed through opening 8 into housing 3 in such a manner that nut member 58 enters its side edges into grooves 59. Then the body, sleeve and piston assembly is inserted through opening 8 into housing 3 and by rotation screw-threadedly connected therewith until this assembly is fluid-tightly connected with the housing, an operation in which the inner end of sleeve 40 is forced into yielding sealing contact with the inner wall 47 of housing 3.

In operation, the valve structure is coupled with the circulating or feeding system by coupling one or both inlets 6, 6' and the outlet 7 with the pressure line of the system and bypass outlet 7 with the return line or the suction line of such system. Liquid from the pressure line will be charged to and through both or either inlet 6, 6' to and through openings 43, bores 30, 30', groove 27, groove 24 and bores 23 into chamber 22, furthermore from bores 30, 30' through bores 31, 31' into chamber 18 below the ring-shaped shoulder 64 of piston 19, which shoulder is offset at 65 to facilitate discharge of liquid into chamber 18 through opening 44, groove 36 and bore 38 into chamber 22 below valve member 48. At this time, piston 19, which is resting upon the ring-shaped end wall 32 of chamber 18, will be lifted against the pressure of spring 55 from wall 32 and shifted axially until the pressure of the liquid has reached a predetermined value. During this time the liquid under pressure is through bores 23 in continuous communication with chamber 22, it being well understood, that during such axial shifting of piston 19 circular groove 25 is continuously in communication with bores 37 and therewith in communication with the liquid under pressure, and that this groove 25 is shifted into communication with groove 28, communicating bores 33, 33' through longitudinal grooves 35, 35' and bores 34, 34' with circular groove 29, which latter groove during shifting of the piston will align with the circumferential groove 24 and therewith through bores 23 with chamber 22. At a predetermined pressure of the liquid, communication between chamber 22 and the liquid under pressure is cut off and communication of chamber 22 with bypass passage 7 is established through bores 23, groove 24, bores 33, 33' and grooves 35, 35'. This new connection effects a sudden release of the pressure in chamber 22 and permits of snap-like shifting of valve member 48 by the pressure below said valve member and therewith sudden full opening of the outlet of the valve at the predetermined pressure. This sudden axial shifting of valve member 48 is effected against the pressure of the helical spring 52, which spring forcibly held valve member 48 in engagement with its seat 16 during the axial movement of piston 19.

Closing of the outlet of the valve with snap-like action, as soon as the pressure of the liquid sinks below the predetermined valve, is self-explanatory, the pressure of spring 52 effecting such closing as soon as piston 19 has been shifted by spring 55 to a position in which communication of chamber 22 with bypass 7 has been cut off and communication of said chamber with the liquid under pressure has been established.

Having thus described my invention, what I claim is:

1. In a pressure regulating valve the combination of an elongated housing having a chamber, intake and outlet ports near one end of said chamber, and a pressure release port near the other end thereof, with a readily exchangeable, pressure actuated, substantially cylindrically shaped valve unit threadedly connected with said housing and extended into its chamber for controlling communication between said ports, said valve unit including valve controlled radial passages and channel-like recesses aligned with said passages, and said radial passages being adapted to be brought successively into communication with said intake port and said pressure release port, said valve unit furthermore including passage means in open communication with said intake port, and a tubular sealing means having its one end secured to said valve unit, encircling all said valve controlled passages and channels, and sealed with its other end to said housing intermediate its intake and pressure release ports to prevent communication of said passage means in said valve unit with said pressure release port.

2. A pressure regulating valve as described in claim 1, wherein the sealing means of said valve unit consists of a metal sleeve having its one end fluid-tightly secured to said valve unit so as to encircle all passages, channels and passage means, wherein said sleeve includes perforations aligned with the passage means of said unit, and wherein said sleeve at its other end is reduced in wall thickness to form a yielding portion fluid-tightly contacting the inner wall of said housing intermediate its intake port and its pressure release port.

3. In a pressure regulating valve the combination of an elongated housing having a chamber, intake and outlet ports near one end of said chamber, and a pressure release port near the other end thereof, with a pressure actuated, substantially cylindrically shaped valve unit releasably connected with said housing and extended into said chamber for controlling communication beween said ports, said valve unit including a valve chamber continuously in communication with said intake port, and another valve chamber adapted to be brought into communication with said intake port only and thereafter into communication with said pressure release port only, valve controlled passages for effecting such communication of said second valve chamber with said intake port and said pressure release port, and a tubular sealing means having its one end secured to said valve unit, encircling all said valve controlled passages and channels on said valve unit and having its other end fluid-tightly sealed to said housing intermediate its intake and pressure release ports for preventing communication between said first valve chamber and said pressure release port.

4. A pressure regulating valve as described in claim 3, wherein said pressure actuated valve unit includes two axially aligned valve chambers of different cross section, both of which chambers are continuously in communication with said intake port, wherein said two valve chambers mount a single piston member having different cross sections and snugly fitting both said valve chambers, and wherein said piston controls the passages communicating with said other valve chamber and effecting successively communication of said other valve chamber with said intake port only and thereafter with said pressure release port only.

JOSEPH F. JAWOROWSKI.